Sept. 8, 1936. J. OSTERTAG Re. 20,105

PURIFICATION SYSTEM FOR BOILERS

Original Filed July 7, 1922

Inventor
Julius Ostertag
By Nathaniel Trucht
Attorney

Reissued Sept. 8, 1936

Re. 20,105

UNITED STATES PATENT OFFICE 20,105

PURIFICATION SYSTEM FOR BOILERS

Julius Ostertag, Stuttgart, Germany

Original No. 1,700,715, dated January 29, 1929, Serial No. 573,415, July 7, 1922. Reissue No. 17,658, dated May 6, 1930, Serial No. 408,400, November 19, 1929. Application for reissue November 22, 1935, Serial No. 51,104

4 Claims. (Cl. 122—398)

Figure 1:
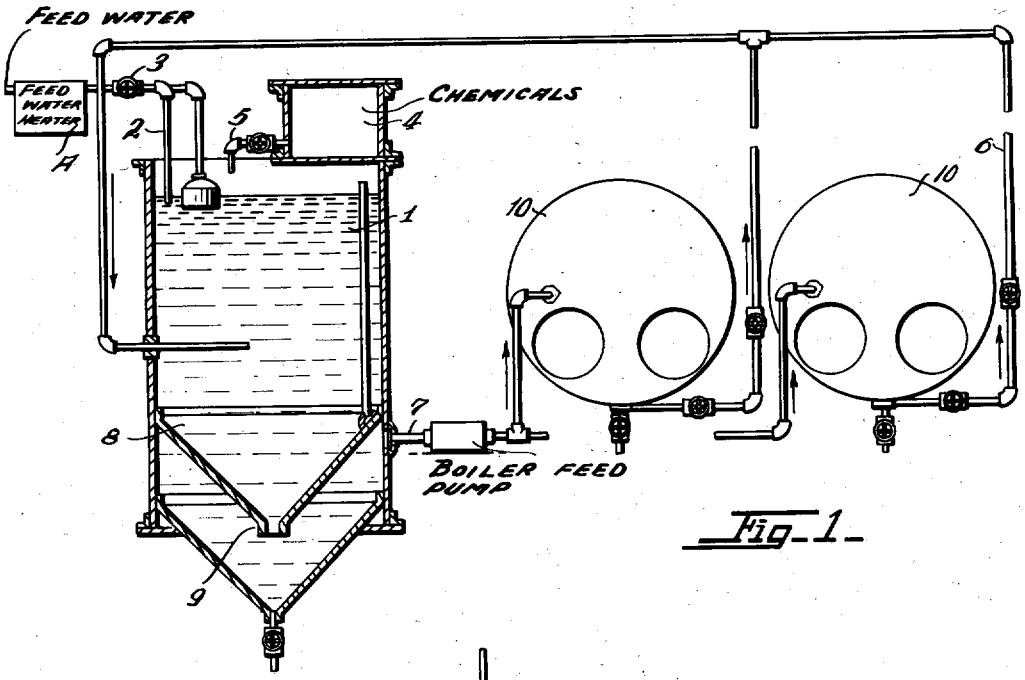

The present invention relates to a method for the purpose of purifying and clearing liquids, particularly boiler feed water.

In all cases the employment of a filter is very inconvenient and frequently for reasons of space impossible, or the filter is not capable of arresting the impurities in the water. The present invention relates to a method that works without a filter and eliminates all impurities.

Moreover, the known arrangements for softening the water are not economical in working and do not ensure prevention of the formation of scale and sludge in boilers.

An arrangement for carrying out the method is illustrated in two forms in the drawing.

Figure 2:
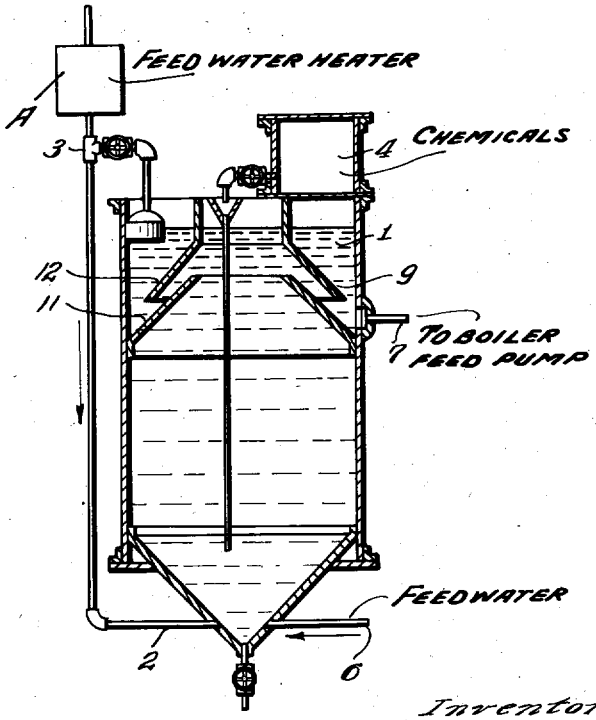

Figs. 1 and 2 are diagrammatic representations in vertical section of two forms of a contrivance for rendering the substances dissolved in the water harmless.

Raw water is preferably heated in a feed water heater A of standard type, and is conveyed into an open receptacle 1 through a pipe 2. The inflow of crude water is regulated by a valve 3 with float. From a vessel 4 the necessary chemicals flow through a pipe 5 into the receptacle 1 (see Fig. 1).

In the receptacle 1 the crude water and the introduced chemicals mix. Hot boiler water is conveyed to the apparatus 1 through a pipe 6, whereby the contents of the apparatus are heated. The introduction of the hot boiler water into the receptacle 1 takes place under pressure, whereby a further intensive mixing of different liquids is effected, and the substances causing hardness are quickly precipitated. The boiler feed water purified and freed from sludge is taken off through a pipe 7.

The freeing of the water from the particles of sludge carried along therewith is effected without the assistance of a filter as in accordance with the invention, the direction of movement of the water is altered.

Further, in the apparatus 1 a conical bottom 8 with an opening 9 is built. The softened water leaves the upper part of the apparatus 1 and enters the lower part thereof through the opening 9. Immediately after passing through the opening 9 the stream of water takes an upward direction.

The operation of the apparatus is as follows:

Through the introduction of the hot boiler-water the temperature of the crude water is increased and thereby the gases dissolved in the water, such as oxygen, nitrogen and carbonic acid forced out. The gases escape in the form of numberless small bubbles which form small floating bodies and in rising take with them all that is in their path particularly the light mud-flakes which have been separated from the crude water. In consequence of this a frothy mass forms on the surface. This consists of sludge and is carried by enclosed gas bubbles. By the introduction of the raw water the gas bubbles are continuously freed from what adheres to them (mud-flakes) and the sludge, which through the described procedure has collected in large flakes, can precipitate and passes through the opening 9 into the lower part of the receptacle 1.

Now as the sludge is specifically heavier than the water it does not change its direction after passing through the opening 9, but falls in a straight line further on to the lowest point in the receptacle 1, from which it can be let off from time to time through a cock or the like into the sludge passage or channel. In consequence of this only perfectly clear water can now come out of the pipe 7 and mud flakes which are specifically lighter than the water can no longer enter the boiler with the purified water, as is the case frequently with other apparatus, because these flakes, in consequence of their lightness rise to the surface and stay there until they are encased by heavier sludge and sink. The water flowing out of the pipe 7 now enters the boiler 10 with a very little residue of hardness. In consequence of the evaporation in the boiler this residue of hardness is completely eliminated in the form of sludge. In the boilers 10 in consequence of the supply of heat from the sides of the furnace a more or less vigorous circulation of water will be continuously effected.

The consequence of this circulation of the water is that the sludge formed from the residue of hardness cannot precipitate on the lowest point in the boiler, but like the water is kept in continuous movement. Now in order to get rid of this sludge before it has reached a dangerous extent a certain quantity of boiler water containing sludge is carried off through the pipe 6 into the receptacle 1. In this there is exactly the same percentage of sludge as there is in the water that is still in the boiler.

Thus in consequence of the continual carrying off of the sludge any dangerous concentration thereof in the boilers is prevented.

The sludge carried on precipitates in the receptacle 1 in the known manner at the lowest point, after being previously subjected to an auxiliary action. This auxiliary action consists in this, viz: that the sludge introduced into the apparatus 1 with the hot boiler-water contributes to convert the sludge formers still in a soluble state into an insoluble state. It is well known that substances in solution become insoluble or crystallized much more quickly if so called centres of crystallization are present. The mud flakes introduced with the hot boiler water may be regarded as such centres of crystallization.

Owing to the fact that the forced out gases have a continuous tendency to carry a portion of the eliminated hardness formers to the upper surface of the receptacle 1, the upper part of the receptacle is a space which is filled with numberless mud flakes, whereby an enormous field of crystallization is created.

In the above described method the carbonate hardness is supposed to be precipitated as far as possible through heating of the water and this heating can be effected outside the apparatus by introduction of exhaust steam or the like in any heater of well-known type, not shown. A complete precipitation of the carbonate hardness by heating the water however is not possible. The non-carbonate hardness has to be precipitated by means of soda or the like. A complete precipitation of the non-carbonate hardness however is only possible by using an excess of soda. This excess of soda enters the boiler with the feed water and is partially converted into caustic soda. This caustic soda formed in the boiler comes with the boiler sludge water continuously back to the purifier and acts in precipitating the residue of the carbonate hardness, which is still present notwithstanding the intensive heating. In this way it is possible to soften the feed water better and less expensively than according to known methods. One known method employs lime for example for precipitating the carbonate hardness. As, however, according to the present application, the carbonate hardness is mainly precipitated by heat which is at once available without cost, and only the residue of hardess requires an additional medium which, however, has only to be applied once, because the soda is continuously regenerated in the boiler, the great advantage of the new method is shown very clearly.

In Fig. 2 another form of construction of the apparatus for carrying out the method is illustrated, the flow of water being reversed.

In this case raw water, chemicals and hot sludge water are introduced into the lower part of the open receptacle 1, whilst the purified water rises through the opening 9 and enters the pipe 7. The opening is formed by means of two funnel or hopper shaped pieces of metal 11 and 12 arranged one above the other. The rapidly rising gas bubbles, with mud flakes carried along therewith also rise in this case to the surface, any escape of the same with the purified water being impossible. The contact effect of the sludge that is being deposited is greater in this arrangement than in the form of construction shown in Fig. 1 because the sludge deposited at the lowest point in the receptacle 1 is continuously stirred up again through the boiler water flowing in under high pressure. The sludge separated from the water may even be regarded as a filter, for in the lower part of the receptacle 1 according to Fig. 2 in a short time an increase of mud flakes will form which prevent the lighter particles of mud flakes from rising. Chemicals are introduced, as in the other form of the device, through a pipe 5; a funnel having a pipe depending therefrom is used to supply the chemicals to the lower end, adjacent the incoming feed and boiler water.

I claim:

1. In a method for continuously purifying boiler feed water during operation of a boiler, the steps of continuously blowing off sludge-containing water from the boiler, preheating make-up water, conducting the boiler blow-off water into a region of lower pressure while maintaining its heat content, and there commingling it with boiler feed water containing the preheated make-up water, the reduction in pressure of the blow-off water, imparting heat to the make-up water for precipitating impurities, freeing the feed water from the impurities and sludge, and feeding said purified feed water to the boiler.

2. In a method for continuously purifying boiler feed water during operation of a boiler, the steps of continuously blowing off sludge-containing water from the boiler, conducting the boiler blow-off water into a region of lower pressure while maintaining its heat content, and there commingling it with boiler feed water, containing make-up water, chemically treating the boiler feed water, the reduction in pressure of the blow-off water imparting heat to the make-up water for precipitating impurities, freeing the feed water from the impurities and sludge, and feeding said purified feed water to the boiler.

3. In a method for continuously purifying boiler feed water during operation of a boiler, the steps of feeding the boiler with feed water containing an excess of sodium carbonate, partially converting the sodium carbonate into caustic soda in the boiler, continuously blowing-off sludge-containing water from the boiler, conducting the blow-off water into a region of lower pressure while maintaining its heat content, and there commingling it with boiler feed water containing make-up water, the reduction in pressure of the blow-off water imparting heat to the make-up water, the caustic soda present in the blow-off water reacting with the impurities in the make-up water to free the feed water from said impurities, and feeding said purified feed water to the boiler.

4. In a method for continuously purifying boiler feed water during operation of a boiler, the steps of feeding the boiler with feed water containing an excess of sodium carbonate, partially converting the sodium carbonate into caustic soda in the boiler, continuously blowing-off-sludge-containing water from the boiler, conducting the blow-off water into a region of lower pressure while maintaining its heat content, and there commingling it with boiler feed water containing make-up water, the reduction in pressure of the blow-off water imparting heat to the make-up water, precipitating impurities in the make-up water due to carbonate hardness by absorption of said heat and by interaction with the caustic soda present in the blow-off water, precipitating impurities in the make-up water due to non-carbonate hardness by interaction with sodium carbonate, freeing the feed water from the precipitated impurities and sludge, and feeding said purified feed water to the boiler.

JULIUS OSTERTAG.